United States Patent
Isrel, Jr. et al.

(10) Patent No.: US 8,402,190 B2
(45) Date of Patent: Mar. 19, 2013

(54) NETWORK ADAPTOR OPTIMIZATION AND INTERRUPT REDUCTION

(75) Inventors: Maurice Isrel, Jr., Raleigh, NC (US);
Bruce H. Ratcliff, Red Hook, NY (US);
Jerry W. Stevens, Raleigh, NC (US);
Edward Zebrowski, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 872 days.

(21) Appl. No.: 12/326,468

(22) Filed: Dec. 2, 2008

(65) Prior Publication Data
US 2010/0138579 A1   Jun. 3, 2010

(51) Int. Cl.
*G06F 13/24* (2006.01)
*G06F 13/32* (2006.01)
(52) U.S. Cl. .................................. 710/261; 710/269
(58) Field of Classification Search ........... 710/260–269
See application file for complete search history.

(56) References Cited

U.S. PATENT DOCUMENTS

| | | | | |
|---|---|---|---|---|
| 3,976,979 A * | 8/1976 | Parkinson et al. | ............... | 703/25 |
| 5,179,661 A * | 1/1993 | Copeland et al. | ............... | 710/29 |
| 5,412,610 A * | 5/1995 | Suzuki | ............... | 365/219 |
| 5,541,853 A * | 7/1996 | Croft | ............... | 709/212 |
| 5,708,814 A * | 1/1998 | Short et al. | ............... | 710/260 |
| 5,796,984 A * | 8/1998 | Pearce et al. | ............... | 703/24 |
| 5,875,343 A * | 2/1999 | Binford et al. | ............... | 710/263 |
| 5,907,712 A * | 5/1999 | Slane | ............... | 710/269 |
| 6,065,089 A * | 5/2000 | Hickerson et al. | ............... | 710/266 |
| 6,092,143 A * | 7/2000 | Williams et al. | ............... | 710/266 |
| 6,112,252 A * | 8/2000 | Hausman et al. | ............... | 709/250 |
| 6,115,775 A * | 9/2000 | Ross et al. | ............... | 710/260 |
| 6,115,776 A * | 9/2000 | Reid et al. | ............... | 710/260 |
| 6,173,343 B1 * | 1/2001 | Delorme | ............... | 710/48 |
| 6,256,699 B1 * | 7/2001 | Lee | ............... | 710/310 |

(Continued)

FOREIGN PATENT DOCUMENTS

| | | | |
|---|---|---|---|
| JP | 06266648 A | * | 9/1994 |
| JP | 09097176 A | * | 4/1997 |

(Continued)

OTHER PUBLICATIONS

"NA9209132: Use of Dynamic Memory Access Asynchronous Communications in the Asynchronous Communications Device Interface", Sep. 1, 1992, IBM, IBM Technical Disclosure Bulletin, vol. 35, Iss. 4A, pp. 132-134.*

(Continued)

*Primary Examiner* — Faisal M Zaman
(74) *Attorney, Agent, or Firm* — Thomas E. Lees, LLC (57) ABSTRACT

A method and system are disclosed for network adaptor optimization and interrupt reduction. The method may generate an immediate I/O interrupt notification to a host device driver in response to receiving data from a network. The method may also update an inbound buffer list based on the received data in the inbound buffer queue. Furthermore, the method may set the buffer state from an empty state to a primed state to indicate that the received data is available for processing. The method may also build an outbound buffer list based on outgoing data and add the outgoing data to an outbound buffer queue. Furthermore, the method may set a buffer state from an empty state to a primed state to indicate that the outgoing data is prepared for transmitting and signal a network adaptor with a notification signal.

10 Claims, 10 Drawing Sheets

U.S. PATENT DOCUMENTS

| | | | |
|---|---|---|---|
| 6,314,525 B1 | 11/2001 | Mahalingham et al. | |
| 6,321,350 B1* | 11/2001 | Baskey et al. | 714/704 |
| 6,338,111 B1* | 1/2002 | Stevens | 710/260 |
| 6,393,493 B1* | 5/2002 | Madden et al. | 719/321 |
| 6,438,628 B1* | 8/2002 | Messerly et al. | 710/35 |
| 6,574,294 B1* | 6/2003 | Lynch et al. | 375/354 |
| 6,622,193 B1* | 9/2003 | Avery | 710/263 |
| 6,687,758 B2 | 2/2004 | Craft et al. | |
| 6,754,755 B1* | 6/2004 | Johnson et al. | 710/262 |
| 6,983,339 B1* | 1/2006 | Rabe et al. | 710/260 |
| 7,047,372 B2* | 5/2006 | Zeitler et al. | 711/154 |
| 7,177,963 B2* | 2/2007 | Burns et al. | 710/52 |
| 7,363,412 B1* | 4/2008 | Patel | 710/262 |
| 7,505,399 B2 | 3/2009 | McGee et al. | |
| 7,693,044 B2 | 4/2010 | Jha et al. | |
| 7,783,784 B1 | 8/2010 | Droux et al. | |
| 7,873,964 B2* | 1/2011 | Huang et al. | 719/314 |
| 7,876,870 B2* | 1/2011 | Lynch et al. | 375/354 |
| 2003/0016670 A1* | 1/2003 | Seidl et al. | 370/392 |
| 2003/0200369 A1* | 10/2003 | Musumeci | 710/260 |
| 2004/0158651 A1 | 8/2004 | Fan et al. | |
| 2005/0097226 A1 | 5/2005 | Tripathi | |
| 2005/0097414 A1* | 5/2005 | Larson et al. | 714/726 |
| 2006/0029097 A1 | 2/2006 | McGee et al. | |
| 2007/0050524 A1* | 3/2007 | Carreno et al. | 710/17 |
| 2008/0126751 A1* | 5/2008 | Mizrachi et al. | 712/30 |
| 2008/0195732 A1* | 8/2008 | Maruyama et al. | 709/224 |
| 2010/0057966 A1* | 3/2010 | Ambikapathy et al. | 710/260 |
| 2010/0303157 A1* | 12/2010 | Abe et al. | 375/240.25 |
| 2011/0093863 A1* | 4/2011 | Verdonck et al. | 718/108 |

FOREIGN PATENT DOCUMENTS

| | | | | |
|---|---|---|---|---|
| JP | 2000148674 A | * | 5/2000 | |
| JP | 2001167003 A | * | 6/2001 | |
| JP | 2008181276 A | * | 8/2008 | |
| JP | 2009181373 A | * | 8/2009 | |
| JP | 2010003257 A | * | 1/2010 | |

OTHER PUBLICATIONS

Martin D. Schwarz, Helmut Seidl, Vesal Vojdani, Peter Lammich, and Markus Müller-Olm. Static analysis of interrupt-driven programs synchronized via the priority ceiling protocol. SIGPLAN Not. 46, 1 (Jan. 2011), 93-104.*

O'Donovan, T.; Benson, J.; Roedig, U.; Sreenan, C.J.; , "Priority interrupts of Duty Cycled communications in wireless sensor networks," Local Computer Networks, LCN 2008. 33rd IEEE Conference on , vol., No., pp. 732-739, Oct. 14-17, 2008.*

Jupyung Lee, Geunsik Lim, and Sang-bum Suh. 2011. Preemptibility-aware responsive multi-core scheduling. In Proceedings of the 2011 ACM Symposium on Applied Computing (SAC '11). ACM, New York, NY, USA, 748-749.*

U.S. Appl. No. 12/326,570, Jeffrey D. Haggar et al., "Transparent Ethernet Link Pairing", filed Dec. 2, 2008.

Office Action dated Jan. 12, 2011 for U.S. Appl. No. 12/326,570, Jeffrey D. Haggar et al., "Transparent Ethernet Link Pairing", filed Dec. 2, 2008.

Final Office Action dated Jun. 21, 2011 for U.S. Appl. No. 12/326,570, Jeffrey D. Haggar et al., "Transparent Ethernet Link Pairing", filed Dec. 2, 2008.

Mike Ebbers, Christopher Hastings, Matt Nutall and Micky Reichenberg, "Introduction to the New Mainframe: Networking", Copyright IBM Corp. 2006, ibm.com/redbooks, Redbooks.

Dmitry Ponomarev, Kanad Ghose and Eugeny Saksonov, "Optimal Polling for Latency-Throughput Tradeoffs in Queue-Based Network Interfaces for Clusters", Dept. of Computer Science, State University of New York, Binghamton, NY and Moscow Institute of Electronics and Mathematics, Moscow, Russia, Copyright 2001.

Dell Inc., "Broadcom Gigabit Ethernet Teaming Services", Version 1.1, Apr. 20, 2004.

"Open Systems Adapter (OSA)", http://publib.boulder.ibm.com/infocenter/zoslnctr/v1r7/topic/com.ibm.znetwork.doc /znetwork_80.html, Sep. 24, 2008, Copyright 1990, 2007.

"Introduction to the New Mainframe: Networking", z/OS Basic Skills Information Center, IBM, Sep. 2007.

Oberly, Eric T.; Office Action in U.S. Appl. No. 12/326,570; "Transparent Ethernet Link Pairing", Mar. 15, 2012; U.S. Patent and Trademark Office; Alexandria, VA.

* cited by examiner

NETWORK ADAPTOR OPTIMIZATION AND INTERRUPT REDUCTION

BACKGROUND OF THE INVENTION

1. Field of the Invention

This invention relates to network adaptors and more particularly relates to network adapter (latency) optimization by optimizing interrupt processing and reducing interrupt frequency.

2. Description of the Related Art

The IBM System z mainframe computer platform may use a specialized network adaptor called an Open Systems Adaptor (OSA). The OSA provides a means to virtualize and abstract the details of the actual hardware Network Interface Card (NIC). The host communicates with the OSA and OSA communicates with the NIC. A single OSA can simultaneously support hundreds of Operating Systems images, and thousands of host connections, and yet even more TCP/IP connections. The OSA provides many advantages, primarily in the area of sharing and virtualization. However, a down side is the latency created by this additional tier or layer that comprises the OSA. This latency is compounded by heavy volume of networking traffic and complicated by higher degrees of adapter sharing.

One main source of delay is the interrupts, or notifications to hardware or software, required for both inbound and outbound data traffic. The latency created by generating and reacting (processor utilization) to the interrupts is a significant delay. Some of this delay is actually within the host itself or the host bus. The frequency and overhead associated with managing interrupts related to very high data rates (1 gbs or 10 gbs links) for so many host connections is an issue related to latency through the OSA.

SUMMARY OF THE INVENTION

The present invention has been developed to provide for network adaptor optimization and interrupt reduction.

A method is presented for generating an immediate I/O interrupt notification, updating an inbound buffer list, and setting the buffer state from an empty state to a primed state.

In one embodiment, the method includes generating an immediate I/O interrupt notification to a host device driver in response to receiving data from a network. The host device driver schedules a host communications stack and sets a buffer state to a state that prevents additional interrupts. The host communications stack enters a polling state causing the host communications stack to wait for available data in an inbound buffer queue. The method may also include updating an inbound buffer list based on the received data in the inbound buffer queue. Furthermore, the method may also include setting the buffer state from an empty state to a primed state to indicate that the received data is available for processing. The host communications stack processes the available data.

In one embodiment, the host communications stack terminates polling in response to a polling timeout. The host communications stack sets the buffer state to indicate that the polling timeout has occurred. In another embodiment, the method includes generating an additional I/O interrupt notification to alert the host communications stack that the received data is available for processing. The buffer state may include a Queued Direct I/O (QDIO) Storage-List-State Block (SLSB). Furthermore, the inbound buffer list may include a QDIO Storage Block Address List (SBAL).

In one embodiment, the SLSB buffer empty state comprises an "Input Buffer Empty (adapter owned)" state and the SLSB buffer primed state comprises an "Input Buffer Primed (program owned)" state.

A system is provided for network adaptor optimization and interrupt reduction. The system may be embodied as a network configured to communicate data between a plurality of devices, an Open Systems Adaptor (OSA), and a host platform, the host platform including a host device driver the host stack. The OSA and host platform may comprise modules configured to functionally perform the necessary steps as described above in relation to the method. These modules may include a generation module, an update module, a primed state update module, a scheduling module, a polling module, a processing module, and in some embodiments, a timeout module, and a secondary update module. In one embodiment, the timeout module sets the buffer state to indicate that the polling timeout has occurred.

A method is presented for building an outbound buffer list based on outgoing data, adding the outgoing data to an outbound buffer queue, and signaling a network adaptor with a notification signal.

In one embodiment, the method includes building an outbound buffer list based on outgoing data. The outgoing data includes data to be transmitted to a network. The method may also include adding the outgoing data to an outbound buffer queue. Furthermore, the method may include setting a buffer state from an empty state to a primed state to indicate that the outgoing data is prepared for transmitting. In addition, the method may include signaling a network adaptor with a notification signal. The network adaptor processes the outbound buffer queue and transmits the outgoing data to the network in response to the notification signal. The network adaptor sets the buffer state to a polling state to indicate that the network adaptor is polling for additional outgoing data. The network adaptor polls for additional outgoing data for a predetermined time interval.

In one embodiment, the method includes releasing the outgoing data in the outbound buffer queue such that the outbound buffer queue may accept additional outgoing data. In some embodiments, the method includes detecting the network adaptor polling based on the polling state and refraining from signaling the network adaptor with an additional notification signal. The network adaptor directly processes the outbound buffer queue and transmits the additional outgoing data to the network.

In certain embodiments, the buffer state comprises a Queued Direct I/O (QDIO) Storage-List-State Block (SLSB). In addition, the outbound buffer list may be a Queued Direct I/O (QDIO) Storage Address Buffer List (SBAL). In one embodiment, the network adaptor times out in response to polling for additional data longer than the predetermined time interval. The network adaptor sets the buffer state to indicate that the outbound buffer queue is empty.

A system is provided for network adaptor optimization and interrupt reduction. The system may be embodied as a host platform, the host platform including a host device driver the host communications stack, a network and an OSA. The OSA and host platform may comprise modules configured to functionally perform the necessary steps as described above in relation to the method. These modules may include a build module, a queue addition module, a state update module, a signal module, a receiving module, a transmission module a polling update module, an OSA polling module, and in some embodiments, a release module, a polling detection module, and a polling time out module.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

BRIEF DESCRIPTION OF THE DRAWINGS

Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, or semiconductor system, apparatus, device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1A:
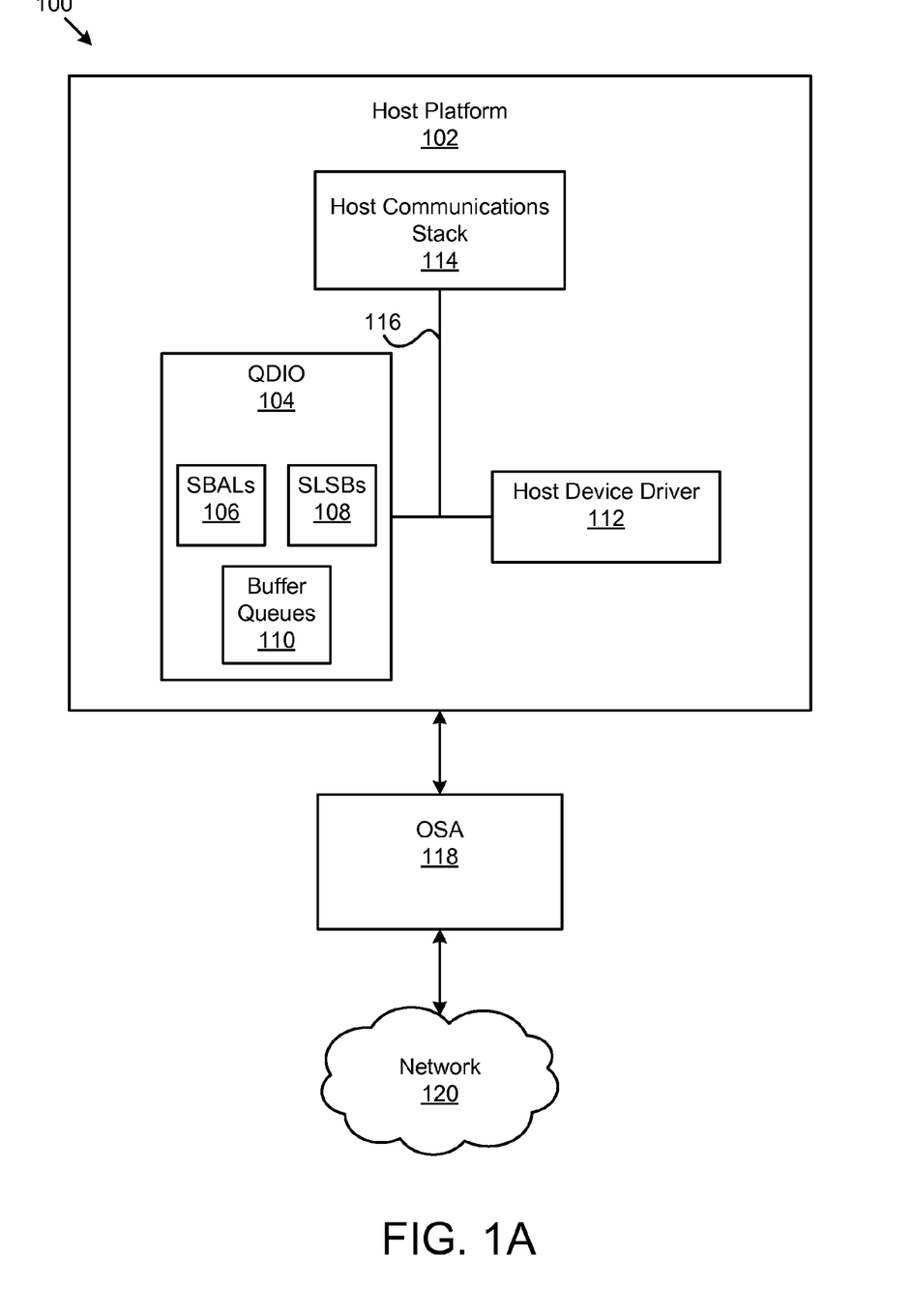
FIG. 1A is a schematic block diagram illustrating one embodiment of a system for network adaptor optimization and interrupt reduction.

FIG. 1A illustrates one embodiment of a system 100 for network adaptor optimization and interrupt reduction. The system 100 includes a host platform 102, an OSA 118 operationally coupled to the host platform 102, and a network 120 in communication with the OSA 118. Furthermore, Queued Direct I/O (QDIO) structures 104 including multiple Storage Address Buffer Lists (SBALs) 106, multiple Storage-List-State Blocks (SLSBs) 108, and multiple buffer queues 110, a host device driver 112, and a host communications stack 114 reside on the host platform 102. A data bus 116 connects the host communications stack 114, the QDIO structures 104, and the host device driver 112. Those of skill in the art recognize that the system 100 may be simpler or more complex than illustrated, so long as the system 100 includes modules or sub-systems that correspond to those described herein.

The host platform 102 may be a System z series mainframe computer capable of running the z/OS operating system (System z and z/OS are trademarks of International Business Machines Corporation) or other similar mainframe computer. The host communications stack 114 may be a Transmission Control Protocol/Internet Protocol (TCP/IP) stack as is commonly known in the art.

The QDIO structures 104 are part of a data transfer architecture and allow direct access to memory on the host platform 102 for TCP/IP data flow. The QDIO structures 104 manage incoming or outgoing data. Specifically, the SBALs 106 provide addresses of the memory blocks of a buffer corresponding to each buffer queue 110. In one embodiment, each buffer queue 110 may have one hundred twenty-eight SBALs 106.

In addition, the SLSBs 108 provide state information about data in the associated buffer queues 110. The hardware and software systems that interact to fill the buffer queues 110 with data and retrieve data from the buffer queues 110 use the states in the SLSBs 108 to synchronize the necessary operations. The SLSB 108 state determines whether the host device driver 112 or the OSA 118 has control over the corresponding buffers. Each SLSB 108 state has a name and a numerical value. In one embodiment, each buffer queue 110 may have one hundred twenty-eight SLSBs 108. In addition, the buffer queues 110 may include both input and output buffers. In certain embodiments, the number of buffers may also equal one hundred twenty-eight.

The host device driver 112 may include a software application that processes incoming data from the buffer queues 110 and schedules a host communications stack 114 to retrieve incoming data from the buffer queues 110. Furthermore, the host device driver 112 may build an outbound buffer SBAL 106 and add outgoing data to the outbound buffer queue 110. Furthermore, the host device driver 112 may signal the OSA 118 when outgoing data is prepared for transmitting.

The OSA 118 is a mainframe network adaptor that may be installed in a mainframe I/O cage or otherwise connected to a mainframe and may include a conventional processor as is known in the art. The OSA 118 may comprise an OSA-Express model or other similar model. The OSA 118 may place data directly into the QDIO buffer queues 110, update the SBAL 106 entries corresponding to the queues by setting the length of each buffer entry (space consumed in this entry by the packet or packets), and update the SLSB as described above. This three step process is also known as "presenting the data." The OSA 118 may then set the SLSB 108 state to a state that indicates to the host platform 102 that data has been placed in the buffers and is ready for processing, or for use in higher levels in the host platform 102. Likewise, the OSA 118 may also retrieve data in the buffer queues 110 and use the SLSB 108 state to determine when data is prepared for retrieval.

Regarding outgoing data (data traveling from the host platform 102 out to the network 120), conventionally, the OSA 118 supports a very brief polling period after processing an outbound buffer. The OSA 118 processes an outbound buffer by transmitting the data in the buffer to the network 120. The OSA 118 briefly polls for more outgoing data before completing the write operation and turning control of the buffer over to the host device driver 112. This brief polling period allows the host device driver 112 to add data to the outbound queues when a write is pending and not be required to signal the adapter for each new output buffer that has data to be transmitted. This current technique results in a reduction of Signal Adapter-write (SIGA-w) signal invocations. However, the OSA 118 may be configured to implement an "extended polling approach" after processing outgoing data. With an "extended polling approach" approach, the host platform 102 will rarely signal the OSA 118 with a SIGA-w signal and will not encounter the associated delays. When the OSA 118 has finished processing the last output buffer, the OSA 118 informs the host device driver 112 that the write is done, but the host device driver 112 can still "tack on" additional outgoing data. Therefore, the OSA 118 may set a new "adapter output polling" SLSB 108 state. This "adapter output polling" state informs the host device driver 112 that a SIGA-w signal is not required to alert the OSA to transmit data.

Figure 1B:
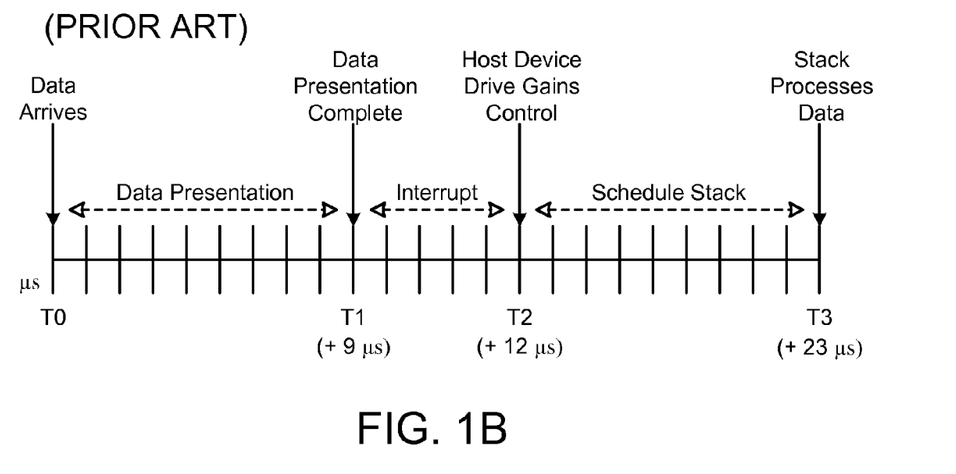
FIG. 1B is a chart illustrating a time delay associated with a conventional Open Systems Adaptor (OSA)

Regarding incoming data, conventionally, the OSA 118 will present the host device driver 112 with newly arrived data, and then generate an I/O interrupt to the host platform 102 so the host device driver 112 can then process the newly arrived data. Referring now to FIG. 1A and FIG. 1B, FIG. 1B is a chart illustrating the time delay associated with the conventional OSA, hypothetical time values of the time delay associated with the conventional operation of the OSA 118, host device driver 112, and host communications stack 114 are shown.

T0 represents the moment when data arrives at the OSA 118. T1 is the time required for the OSA 118 to present the data to the host device driver 112 (all 3 steps of data presentation complete), assuming T1=T0+9 microseconds (9 microseconds of total time for the OSA 118 to present the data including updating the QDIO structures 104). T2 represents the moment when the host device driver 112 gains control from the interrupt, assume T2=T1+5 microseconds (5 microseconds for the OSA to generate the interrupt and the host platform 102 to dispatch a processor to the host image to process the interrupt). T3 represents the moment when the host communications stack 114 gains control (is dispatched) to process the data, assuming T3=T2+9 microseconds, the total time it takes for host device driver 112 to stage (queue) the data to the stack, schedule the host communications stack 114, and the time it takes the host dispatcher to dispatch the new work. The total time (latency) for the host communications stack 114 to begin processing data since it arrived at host platform 102 is 23 microseconds.

Referring back to FIG. 1A, in one embodiment, the OSA 118 generates the host interrupt immediately as soon as data is received, and then proceeds with data presentation. The data presentation and host interrupt run in parallel. By generating the interrupt before beginning data presentation, the OSA 118 reduces the time gap that conventionally exists between the moment of the interrupt, and the moment when the host device driver 112 gains control and begins processing the data.

Figure 1C:
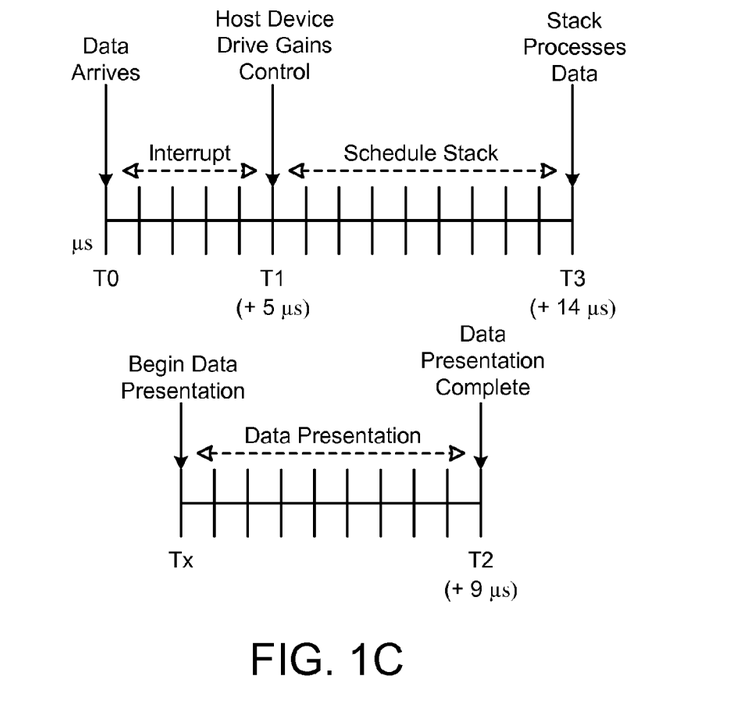
FIG. 1C is a chart illustrating a reduction in the time delay in accordance with the present invention.

Referring now to FIG. 1A and FIG. 1C, FIG. 1C is a chart illustrating the reduction in the time delay, one example using hypothetical time values of the time required when the OSA 118 generates the host interrupt as soon as data is received is shown.

T0 represents the moment when data arrives at the OSA 118. T1 represents the moment when the host device driver 112 gains control from the interrupt, assuming T1=T1+5 microseconds (5 microseconds for the OSA to generate the interrupt and the host platform 102 to dispatch a processor to the host image to process the interrupt). Tx represents the moment when the OSA 118 begins presenting data to the host device driver 112. T2 represents the time required for data presentation (all 3 steps of data presentation complete). As illustrated, now data presentation overlaps with T1 and T3 processing. T3 represents the moment when the host communications stack 114 gains control (is dispatched) to process the data. If the data presentation is not complete when the host communications stack 114 gains control to process the data, the host communications stack 114 will enter a polling state as discussed below. FIG. 1C assumes T3=T1+9 microseconds, the total time it takes for host device driver 112 to stage (queue) the data to the stack, schedule the host communications stack 114, and the time it takes the host dispatcher to dispatch the new work.

Total time (latency) for the host communications stack 114 to begin processing data since it arrived at host platform 102 is now 14 microseconds (vs. 23 microseconds . . . savings of 9 microseconds). Note that the full 9 microseconds may not be saved as the host communications stack 114 may gain control before data presentation is complete.

Referring back to FIG. 1A, the network 120 may be a global communications network such as the Internet, a Local Area Network (LAN), multiple LANs communicating over the internet, or any other similar communications network.

Figure 2:
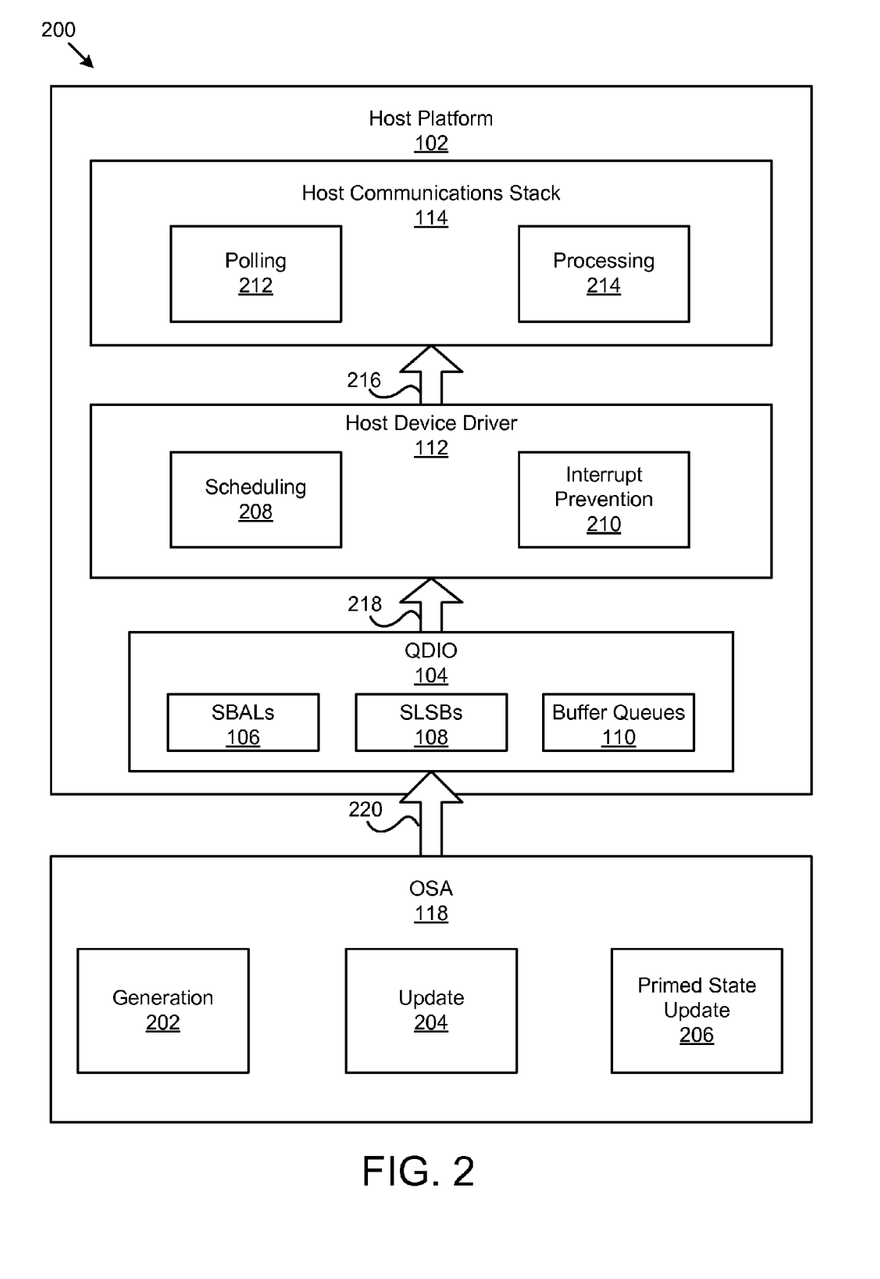
FIG. 2 is a schematic block diagram illustrating one embodiment of an apparatus for network adaptor optimization and interrupt reduction.

FIG. 2 illustrates one embodiment of an apparatus for network adaptor optimization and interrupt reduction. The apparatus 200 includes a generation module 202, an update module 204, a primed state update module 206, a scheduling module 208, an interrupt prevention module 210, a polling module 212, and a processing module 214. Furthermore, arrows 216, 218, and 220 indicate data flow direction.

In one embodiment, the generation module 202, which may reside on the OSA 118, generates an immediate I/O interrupt notification to a host device driver 112 in response to receiving data from the network 120. An immediate I/O interrupt notification is an interrupt notification generated by the generation module 202 upon receipt of the incoming data instead of generating an interrupt notification after the OSA 118 has presented the data (which includes updating the state of the SBAL 106). In one embodiment, the generation module 202 is configured to review user preferences and the user preferences may activate or deactivate immediate I/O interrupt notification.

In one embodiment, the update module 204, which may reside on the OSA 118, updates an inbound QDIO SBAL 106 based on the received data in an inbound QDIO buffer queue 110. The process of updating the QDIO SBAL 106 or presenting the data, is performed after the immediate I/O interrupt notification.

In one embodiment, the primed state update module 206, which may reside on the OSA 118, sets an SLSB 108 buffer state from an empty state to a primed state to indicate that the received data is available for processing. Specifically, the SLSB 108 buffer empty state may include an "Input Buffer Empty (adapter owned)" state and the SLSB 108 buffer primed state may include an "Input Buffer Primed (program owned)" state. The SLSB 108 buffer primed state indicates to the host device driver 112 that the data presentation is complete and turns control of the corresponding buffer queues 110 to the host device driver 112.

In one embodiment, the scheduling module 208 schedules a host communications stack 114. The scheduling module 208 schedules the stack as though data is available even though the data is not yet in the input QDIO buffer queue 110 and available. As used herein, "available data" is data that has been presented by the OSA 118 and is available for processing by the host communications stack 114 and the host device driver 112. Furthermore, as known by one of ordinary skill in the art, to schedule a communications stack means to alert, or notify a stack to process data. The stack processes data by copying the data from the input buffer queue 110 for use by applications at higher levels in the host platform 102.

By scheduling the communications stack 114 before data is available, the scheduling module 208 greatly reduces the time delay associated with scheduling the communications stack 114. Conventionally, the largest time delay exists between the moment the OSA 118 has presented the data and the moment that the communications stack 114 begins processing the data. This is due to the fact that the communications stack 114, once scheduled, will not begin processing the data immediately. This delay is caused by typical Operating System dispatching delays such as work load priority, scheduling and dispatching, CPU contention, hypervisor resource contention (sharing CPUs with other images) and other interrupt processing, etc. When the scheduling module 208 schedules the communications stack 114 before data is available, in most cases, the OSA 118 has finished presenting the data by the time the communications stack 114 is dispatched to process the data.

In one embodiment, the interrupt prevention module 210, residing on the host device driver 112, sets the SLSB 108 buffer state to a state that prevents additional interrupts from being sent to the host device driver 112. This SLSB 108 state may include an Input Buffer Acknowledged State, an existing SLSB 108 state which notifies the OSA 118 to refrain from generating any additional interrupts.

In one embodiment, the polling module 212 on the host communication stack enters a polling state and polls for available data in the inbound QDIO buffer queue 110. The polling module 212 must poll because the inbound buffer queue 110 may not contain available data. In one embodiment, the processing module 214 on the host communication stack processes the available data after the data presentation is complete.

Figure 3:
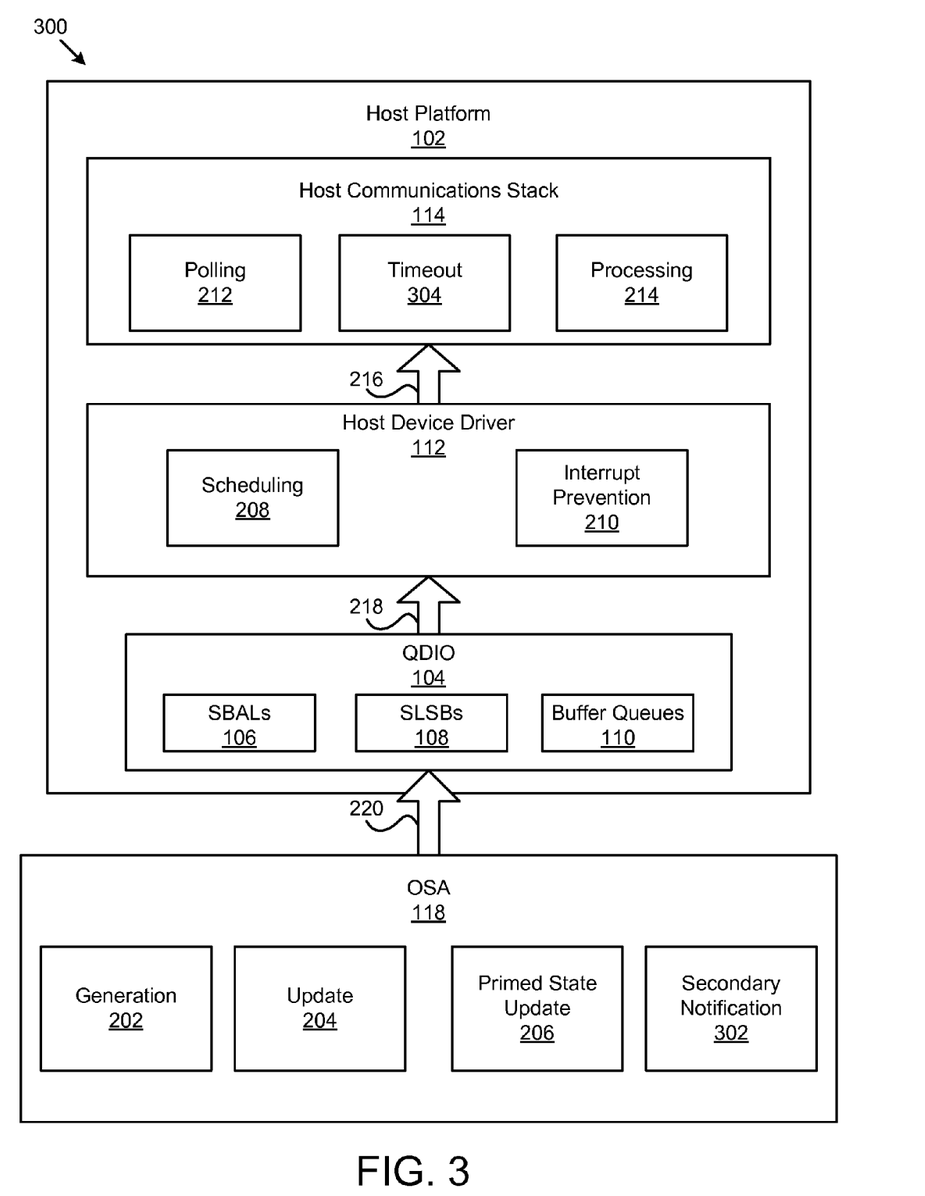
FIG. 3 is a detailed schematic block diagram illustrating one embodiment of an apparatus for network adaptor optimization and interrupt reduction.

FIG. 3 illustrates another embodiment of an apparatus for network adaptor optimization and interrupt reduction. The apparatus 300 includes the generation module 202, the update module 204, the primed state update module 206, the scheduling module 208, the interrupt prevention module 210, the polling module 212, and a processing module 214, wherein these modules include substantially the same features as described above in relation to FIG. 2. Additionally, in one embodiment, the apparatus 300 contains a secondary notification module 302 and a timeout module 304. As in FIG. 2, arrow 216, 218, and 220 indicate data flow direction.

In one embodiment, the timeout module 304 on the host communications stack 114 terminates polling in response to a polling timeout. Because the polling duration of the host communications stack 114 must be finite, if the promised data is delayed or lost/dropped, the timeout module 304 terminates polling. The timeout module 304 sets the buffer state to a new state to indicate that the polling timeout has occurred and alert the OSA 118 that the host communications stack 114 is no longer polling for the promised data. This new state, in one embodiment, is named "Input_Buffer_Ack_TimeOut" with an associated numerical value. However, one of ordinary skill in the art realizes that any name and value distinct from other existing QDIO state names and values may be used.

In one embodiment, the secondary notification module 302 on the OSA 118 generates an additional I/O interrupt notification to alert the host communications stack 114 that the received data is available for processing following polling of the host communications stack 114 timing out. In one embodiment, when the data presentation is finally complete, the secondary notification module 302 checks the SLSB 108 state to verify that the SLSB 108 state has been set to indicate a polling timeout. If the SLSB 108 state does indicate a polling timeout, the secondary notification module 302 generates an additional interrupt to alert the host platform 102 and the host communications stack 114 that available data resides in the buffer queue 110.

Figure 4:
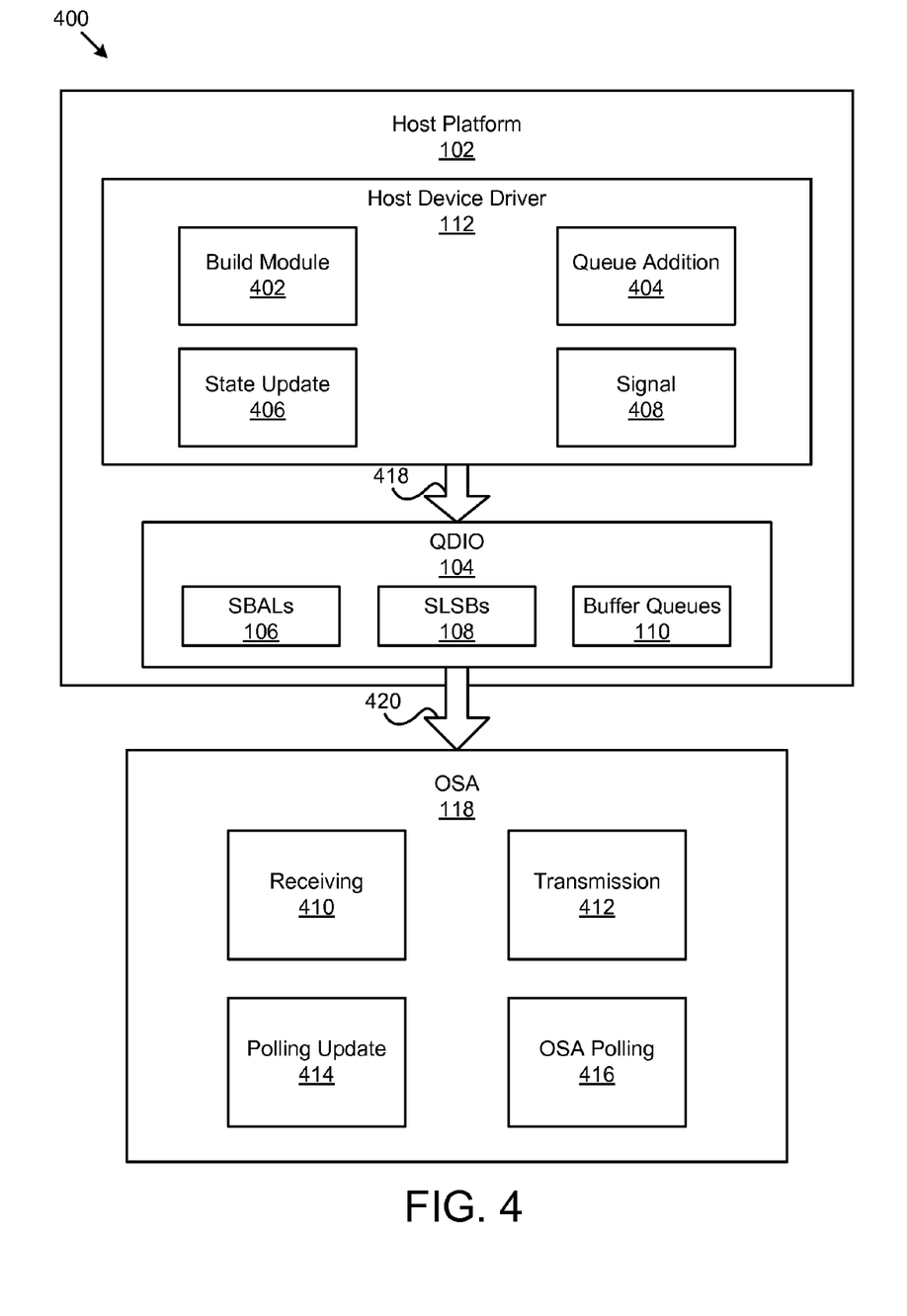
FIG. 4 is a schematic block diagram illustrating another embodiment of an apparatus for network adaptor optimization and interrupt reduction.

FIG. 4 illustrates another embodiment of an apparatus for network adaptor optimization and interrupt reduction. The apparatus 400 includes a build module 402, a queue addition module 404, a state update module 406, a signal module 408, a receiving module 410, a transmission module 412, a polling update module 414, and an OSA polling module 416. Furthermore, arrows 418 and 420 indicate data flow direction.

In one embodiment, the build module 402 builds an outbound QDIO Storage SBAL 106 based on outgoing data. In one embodiment, the queue addition module 404 on the host device driver 112 adds the outgoing data to an outbound QDIO buffer queue 110.

In one embodiment, the state update module 406 sets the SLSB 108 buffer state from an empty state to a primed state to indicate that the outgoing data is prepared for transmitting. Moreover, in one embodiment, the signal module 408 on the host device driver 112 signals the OSA 118 with a SIGA-w signal. The SIGA-w signal notifies the OSA 118 to transmit the data.

In one embodiment, the receiving module 410 on the OSA 118 receives the SIGA-w signal. In addition, in one embodiment, the transmission module 412 processes the outbound buffer queue 110 and transmits the outgoing data to the network 120 in response to the SIGA-w signal.

In one embodiment, the polling update module 414 on the OSA 118 sets the SLSB 108 buffer state to a polling state to indicate that the OSA 118 is polling for additional outgoing data. This polling SLSB 108 state is a new state that alerts the host device driver 112 that more outgoing data will be processed by the polling update module 414 without the need to generate another SIGA-w signal. The host device driver 112 can free all buffers associated with this SBAL 106 and the OSA 118 is now polling for new outbound work. This new state may be named "Output_Buffer_Ack" with an associated numerical value. However, one of ordinary skill in the art realizes that any name and value distinct from other existing QDIO state names may be used.

In one embodiment, the OSA polling module 416 on the OSA 118 polls for additional outgoing data. The OSA polling module 416 may immediately process any additional outgoing data, or data prepared by the host device driver 112 subsequent to the outgoing data that required the SIGA-w signal.

Figure 5:
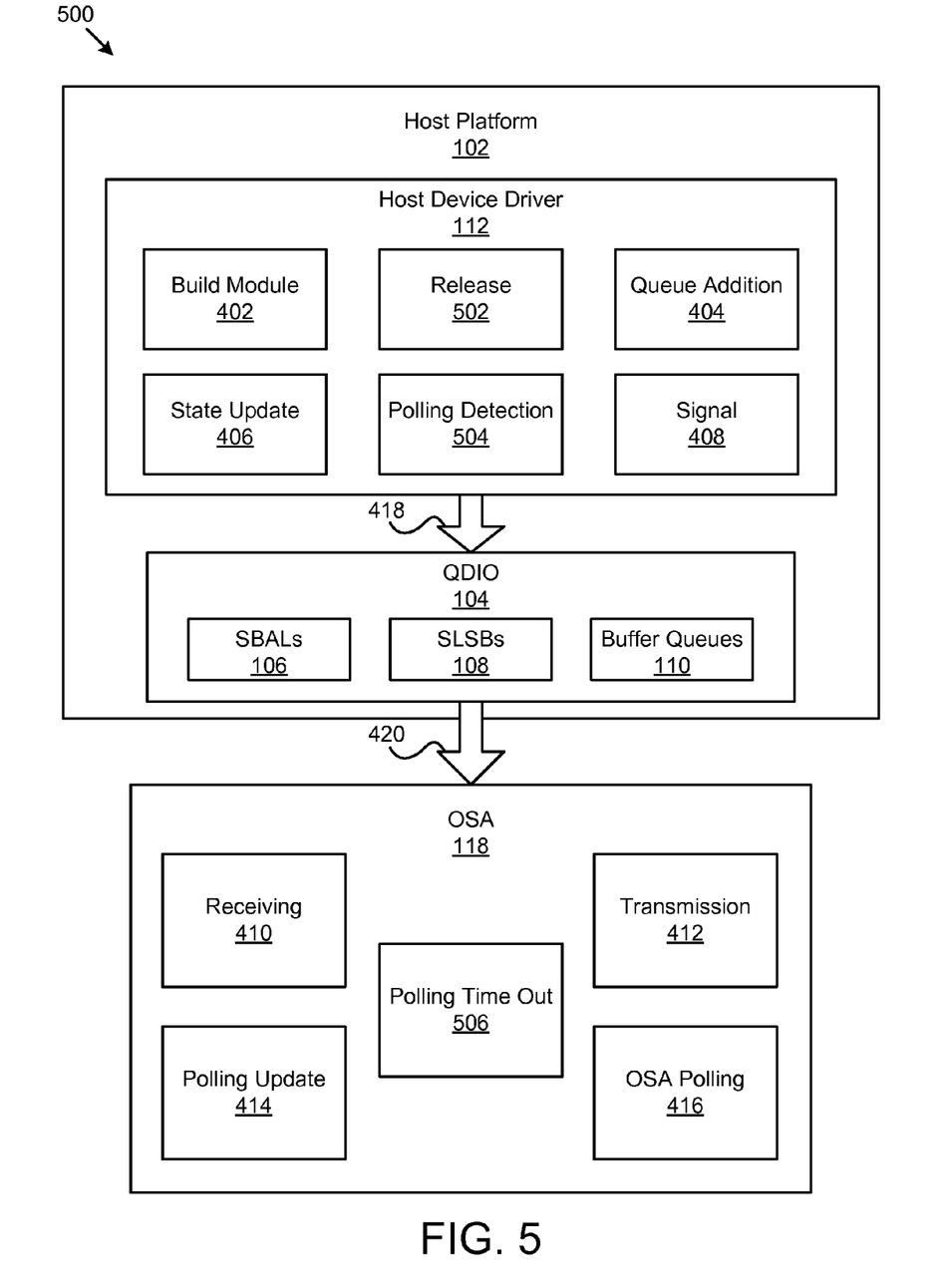
FIG. 5 is a detailed schematic block diagram illustrating another embodiment of an apparatus for network adaptor optimization and interrupt reduction.

FIG. 5 illustrates another embodiment of an apparatus for network adaptor optimization and interrupt reduction. The apparatus 500 includes the build module 402, the queue addition module 404, the state update module 406, the signal module 408, the receiving module 410, the transmission module 412, the polling update module 414, and the OSA polling module 416, wherein these modules include substantially the same features as described above in relation to FIG. 4. Additionally, in one embodiment, the apparatus 500 contains a release module 502, a polling detection module 504, and a polling timeout module 506. As in FIG. 4, arrows 418 and 420 indicate data flow direction.

In one embodiment, once the OSA 118 has transmitted the outgoing data, the release module 502 on the host device driver 112 releases the associated memory blocks of the data buffers for the outgoing data in the outbound buffer queue 110 such that the outbound buffer queue 110 may accept additional outgoing data.

In addition, in one embodiment, the polling detection module 504 detects that the OSA 118 is polling based on the polling state in the SLSB 108. The polling state notifies the polling detection module 504 that the OSA 118 is polling for additional outgoing data to transmit directly and that the OSA 118 will not require a SIGA-w signal to handle additional outgoing data.

In one embodiment, the polling timeout module 506 on the OSA 118 times out in response to polling for additional data longer than a predetermined time interval without handling additional data during a pollout interval. In practice, the OSA 118 cannot poll indefinitely. If the output activity slows for a specific pollout interval (the host platform 102 is idle), then the OSA 118 will stop polling. In this situation, the polling timeout module 506 may set the SLSB 108 state to a state indicating that the OSA 118 is no longer polling. The polling timeout module 506 may set the SLSB 108 buffer state to an existing state that indicates that the outbound buffer queue 110 is empty which notifies the host device driver 112 that the OSA 118 is no longer polling.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
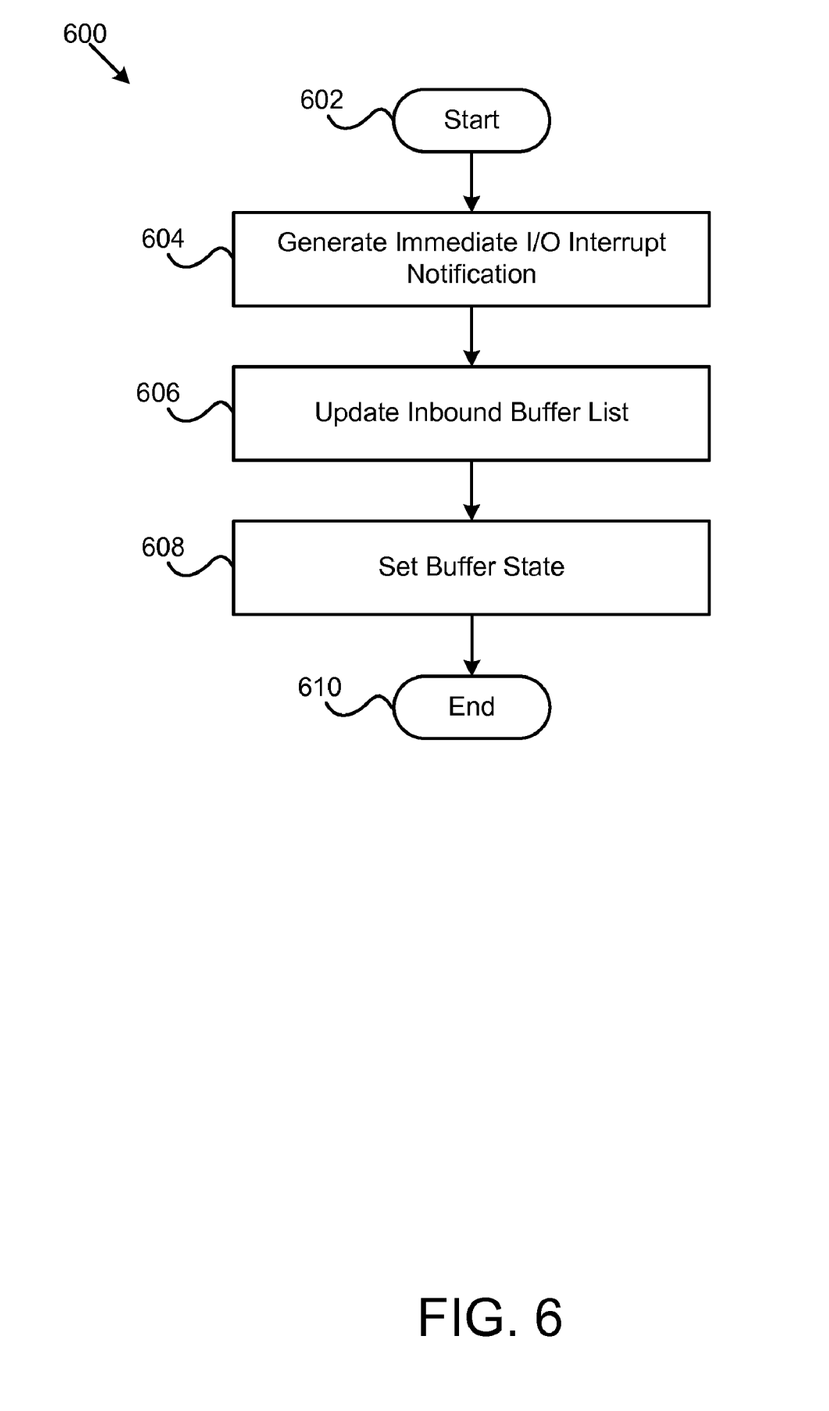
FIG. 6 is a schematic flow chart diagram illustrating one embodiment of a method for network adaptor optimization and interrupt reduction.

FIG. 6 illustrates one embodiment of a method for network adaptor optimization and interrupt reduction. This method 600 involves inbound data. The method 600 starts 602 when the generation module 202 generates 604 an immediate I/O interrupt notification to a host device driver 112 in response to receiving data from a network 120. The host device driver 112 schedules a host communications stack 114 and sets a buffer state 108 to a state that prevents additional interrupts of the host device driver 112. Furthermore, the host communications stack 114 enters a polling state to wait for available data in an inbound buffer queue 110. Next, the update module 204 updates 606 an inbound buffer list 106 based on the received data in the inbound buffer queue 110. Then, the primed state update module 206 sets 608 the buffer state 108 from an empty state to a primed state to indicate that the received data is available for processing and the host communications stack 114 processes the available data and the method 600 ends 610.

Figure 7A:
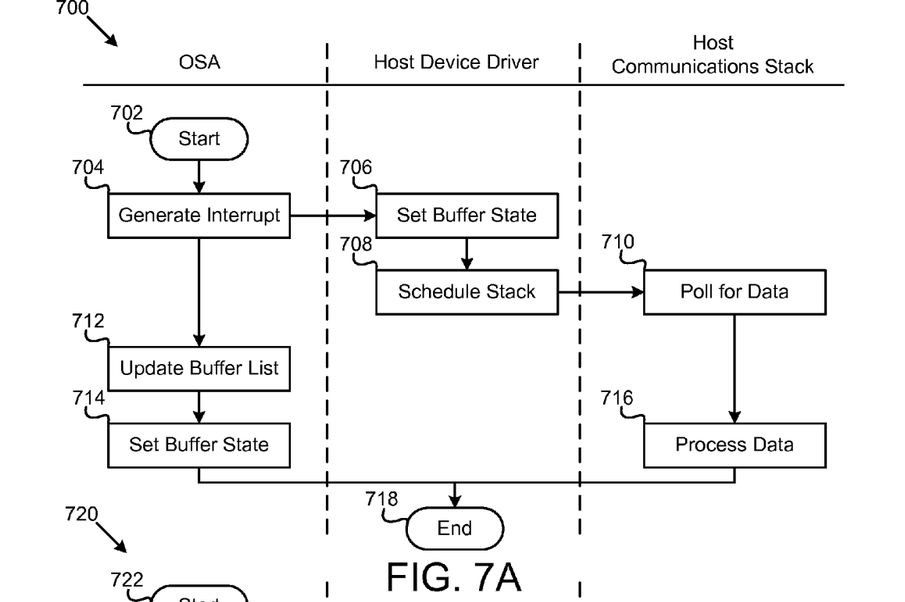
FIG. 7A is a detailed schematic block diagram illustrating one embodiment of a method for network adaptor optimization and interrupt reduction.

FIG. 7A illustrates another embodiment of a method for network adaptor optimization and interrupt reduction. As with the method 600 in FIG. 6, this method 700 also involves inbound data. The method 700 starts 702 on the OSA 118 when the generation module 202 generates 704 an immediate I/O interrupt notification to a host device driver 112 in response to receiving data from the network 120. Then, the interrupt prevention module 210 of the host device driver 112 sets 706 the SLSB 108 buffer state 108 to a state that prevents additional interrupts. Next, the scheduling module 208 of the host device driver 112 schedules 708 a host communications stack 114. On the host communications stack 114, the polling module 212 enters a polling state causing the polling module 212 to poll 710 for available data in the inbound buffer queue 110.

Meanwhile, on the OSA 118, the update module 204 updates 712 the inbound QDIO SBAL 106 based on the received data in the inbound buffer queue 110. The primed state update module 206 then sets 714 an SLSB 108 buffer state 108 from an empty state to a primed state to indicate that the received data is available for processing. On the host communications stack 114, the processing module 214 processes 716 the available data and the method 700 ends 718.

Figure 7B:
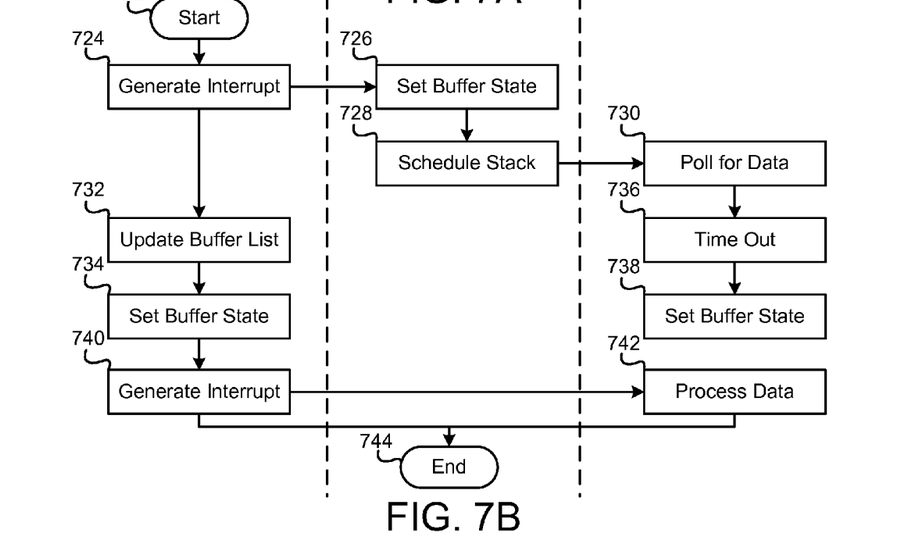
FIG. 7B is a detailed schematic block diagram illustrating one embodiment of a method for network adaptor optimization and interrupt reduction.

FIG. 7B illustrates another embodiment of a method for network adaptor optimization and interrupt reduction. This method 720 also involves inbound data. The method 720 starts 722 on the OSA 118 when the generation module 202 generates 724 an immediate I/O interrupt notification to a host device driver 112 in response to receiving data from the network 120. Then, the interrupt prevention module 210 of the host device driver 112 sets 726 the SLSB 108 buffer state to a state that that prevents additional interrupts. Next, the scheduling module 208 of the host device driver 112 schedules 728 a host communications stack 114. On the host communications stack 114, the polling module 212 enters 730 a polling state to cause the host communications stack to wait for available data in the inbound buffer queue 110.

Meanwhile, on the OSA 118, the update module 204 updates 732 the inbound QDIO SBAL 106 based on the received data in the inbound buffer queue 110. The primed state update module 206 then sets 734 an SLSB 108 buffer state from an empty state to a primed state to indicate that the received data is available for processing. However, in this embodiment, the timeout module 304 on the host communications stack 114 times out 736 and terminates polling because data presentation has taken too long. The timeout module 304 then sets the buffer state 108 to indicate that the polling timeout has occurred. The secondary notification module 302 of the OSA 118 then generates 740 an additional I/O interrupt notification to alert the host communications stack 114 that the received data is available for processing. Then, the processing module 214 of the host communications stack 114 processes 742 the available data and the method 720 ends 744.

Figure 8:
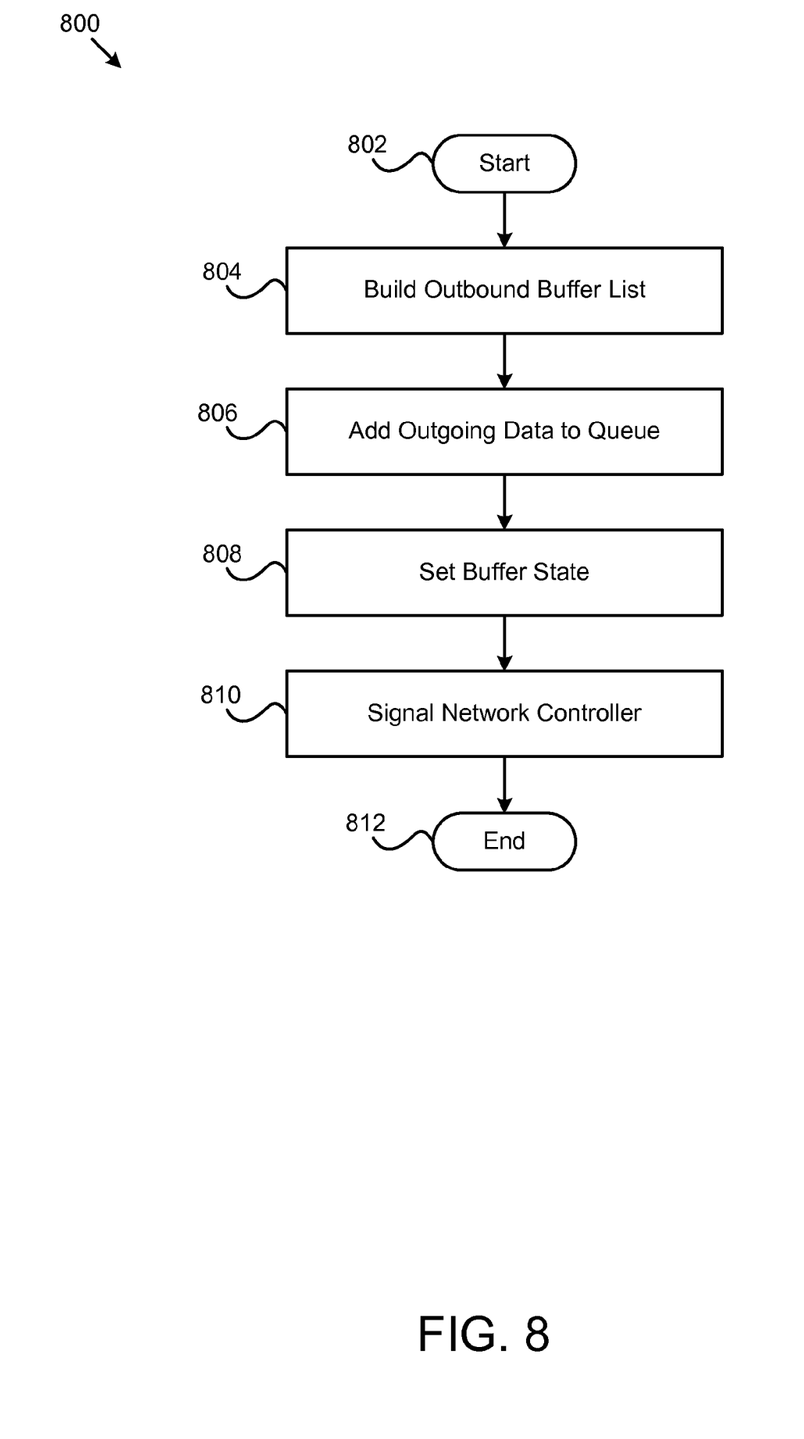
FIG. 8 is a schematic flow chart diagram illustrating another embodiment of a method for network adaptor optimization and interrupt reduction.

FIG. 8 illustrates another embodiment of a method for network adaptor optimization and interrupt reduction. This method 800 involves outbound data. The method 800 starts 802 when the build module 402 builds 804 an outbound buffer list 106 based on outgoing data. Then, the queue addition module 404 adds 806 the outgoing data to an outbound buffer queue 110. Next, the state update module 406 sets 808 the buffer state 108 from an empty state to a primed state to indicate that the outgoing data is prepared for transmitting. Then the signal module 408 signals 810 a network adaptor 118 with a notification signal. The network adaptor 118 will process the outbound buffer queue 110 and transmit the outgoing data to the network 120. In addition, the network adaptor 118 will set the buffer state 108 to a polling state to indicate that the network adaptor 118 is polling for additional outgoing data. The network adaptor 118 will poll for additional outgoing data for a predetermined time interval. Then the method 800 ends 812.

Figure 9:
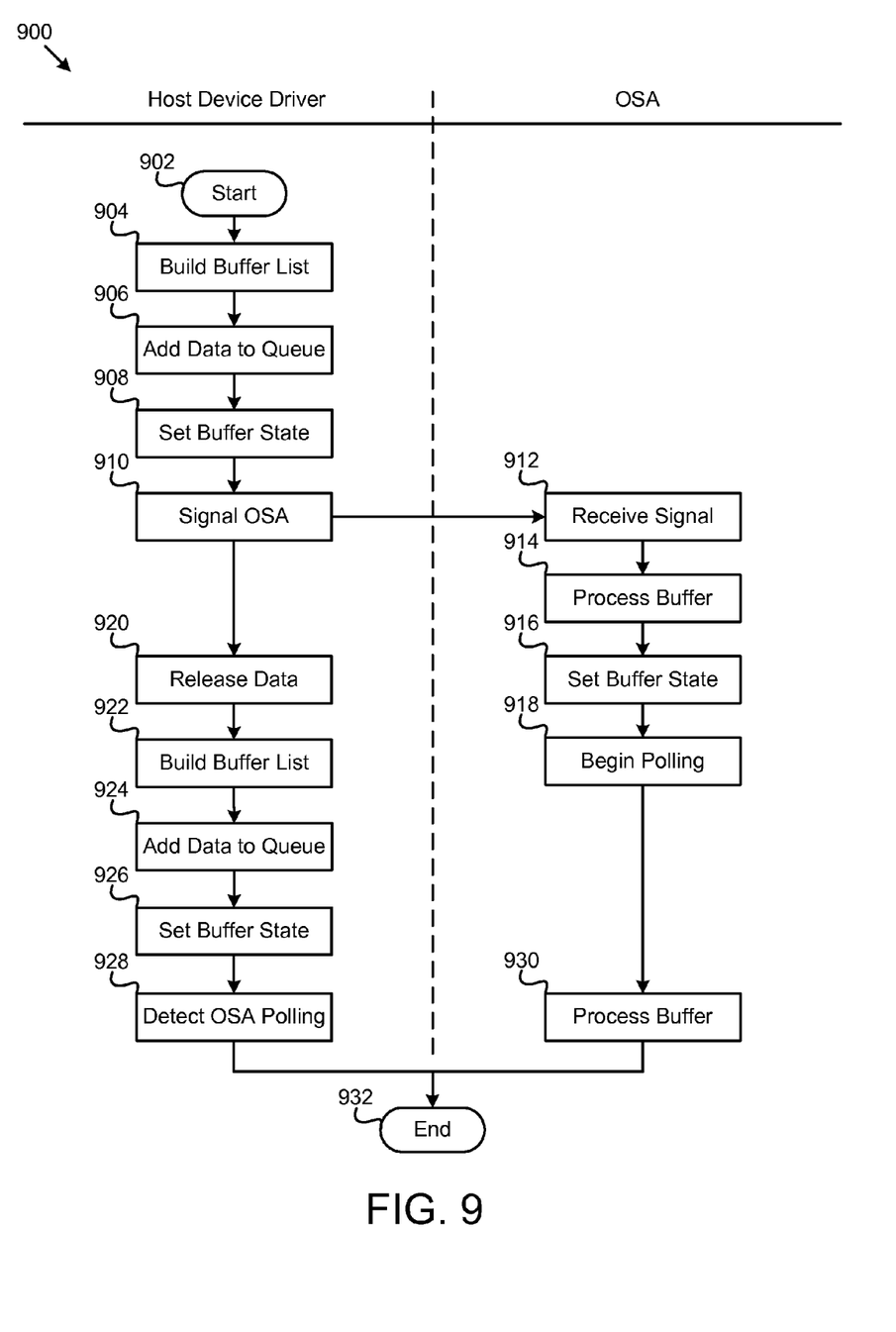
FIG. 9 is a detailed schematic flow chart diagram illustrating another embodiment of a method for network adaptor optimization and interrupt reduction.

FIG. 9 illustrates another embodiment of a method for network adaptor optimization and interrupt reduction. As with the method 800 in FIG. 8, this method 900 also involves outbound data. The method 900 starts 902 when the build module 402 on the host device driver 112 builds 904 an outbound QDIO SBAL 106 based on outgoing data. Then, the queue addition module 404 adds 906 the outgoing data to an outbound buffer queue 110. Next, the state update module 406 sets 908 the SLSB 108 buffer state from an empty state to a primed state to indicate that the outgoing data is prepared for transmitting. The signal module 408 then signals 910 the OSA 118 with a SIGA-w signal. On the OSA 118, the receiving module 410 receives 912 the SIGA-w signal. Next, the transmission module 412 processes 914 the outbound buffer queue 110 and transmits the outgoing data to the network 120. The polling update module 414 sets 916 the SLSB 108 buffer state to a polling state to indicate that the OSA 118 is polling for additional outgoing data. The OSA polling module 416 then begins to poll 918 for additional outgoing data.

Meanwhile, on the host device driver 112, the release module 502 releases 920 the outgoing data in the outbound buffer queue 110 to allow the outbound buffer queue 110 to accept additional outgoing data. As additional outgoing data is prepared for transmitting, the build module 402 once again builds 922 the outbound SBAL 106 based on additional outgoing data. The queue addition module 404 adds 924 the additional outgoing data to the outbound buffer queue 110. The state update module 406 sets 926 the SLSB 108 buffer state from the empty state to the primed state to indicate that the additional outgoing data is prepared for transmitting. Next, the polling detection module 504 detects 928 that the OSA 118 polling based on the polling state. The transmission module 412 of the OSA 118 directly processes 930 the additional outgoing data and transmits the additional outgoing data to the network 120 and the method 900 ends 932.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for network adaptor optimization and interrupt reduction, the method comprising:
    generating an immediate I/O interrupt notification to a host device driver in response to receiving data from a network, wherein generating an immediate interrupt occurs before the data is presented for processing regardless of an amount of data received, the host device driver configured to schedule a host communications stack and set a buffer state to a state that prevents additional interrupts of the host device driver, the host communications stack configured to enter a polling state causing the host communications stack to wait for available data in an inbound buffer queue;
    updating an inbound buffer list based on the received data in the inbound buffer queue; and
    setting the buffer state from an empty state to a primed state to indicate that the received data is available for processing, the host communications stack configured to process the available data.

2. The method of claim 1, wherein the host communications stack terminates polling in response to a polling timeout, the host communications stack setting the buffer state to indicate that the polling timeout has occurred.

3. The method of claim 2, further comprising generating an additional I/O interrupt notification configured to alert the host communications stack that the received data is available for processing.

4. The method of claim 1, wherein the buffer state comprises a Queued Direct I/O (QDIO) Storage-List-State Block (SLSB).

5. The method of claim 1, wherein the inbound buffer list comprises a QDIO Storage Block Address List (SBAL).

6. The method of claim 1, wherein the SLSB buffer empty state comprises an "Input Buffer Empty (adapter owned)" state and the SLSB buffer primed state comprises an "Input Buffer Primed (program owned)" state.

7. A system for network adaptor optimization and interrupt reduction, the system comprising:
    a network configured to communicate data between a plurality of devices;
    an Open Systems Adaptor (OSA) in communication with the network, the OSA comprising:
        a generation module configured to generate an immediate I/O interrupt notification to a host device driver in response to receiving data from the network, wherein generating an immediate interrupt occurs before the data is presented for processing regardless of an amount of data received;
        an update module configured to update an inbound Queued Direct I/O (QDIO) Storage Address Buffer List (SBAL) based on the received data in an inbound QDIO buffer queue;
        a primed state update module configured to set a Storage-List-State Block (SLSB) buffer state from an empty state to a primed state to indicate that the received data is available for processing;
    a host platform operationally coupled with the OSA, the host platform comprising:
        a host device driver comprising:
            a scheduling module configured to schedule a host communications stack;
            an interrupt prevention module configured to set the SLSB buffer state to a state that prevents additional interrupts;
        the host communications stack comprising:
            a polling module configured to enter a polling state causing the host communications stack to wait for available data in the inbound QDIO buffer queue; and
            a processing module configured to process the available data.

8. The system of claim 7, wherein the SLSB buffer empty state comprises an "Input Buffer Empty (adapter owned)" state and the SLSB buffer primed state comprises an "Input Buffer Primed (program owned)" state.

9. The system of claim 7, wherein the host communications stack further comprises a timeout module configured to terminate polling in response to a polling timeout, the timeout module setting the SLSB buffer state to indicate that the polling timeout has occurred.

10. The system of claim 9, wherein the OSA further comprises a secondary notification module configured to generate an additional I/O interrupt notification configured to alert the host communications stack that the received data is available for processing.

* * * * *